United States Patent [19]

Gauthier

[11] Patent Number: 4,578,952

[45] Date of Patent: Apr. 1, 1986

[54] HYDROGEN-CONCENTRATING PROCESS AND APPARATUS

[75] Inventor: Pierre Gauthier, Fresnes, France

[73] Assignee: L'Air Liquide, Societe Anonyme pour l'Etude et l'Exploitation des Procedes Georges Claude, Paris, France

[21] Appl. No.: 608,237

[22] Filed: May 8, 1984

[30] Foreign Application Priority Data

May 16, 1983 [FR] France ................................ 83 08041

[51] Int. Cl.$^4$ ............................................. F01K 25/06
[52] U.S. Cl. ........................................ 60/649; 60/648; 60/657
[58] Field of Search ................. 60/648, 651, 671, 657, 60/649, 673

[56] References Cited

U.S. PATENT DOCUMENTS 3,038,318  6/1962  Hanny ................................. 62/192
3,568,438  3/1971  Meienberg ........................ 60/648 X
4,273,743  6/1981  Barber et al. ..................... 60/648 X

FOREIGN PATENT DOCUMENTS 2048448  5/1979  United Kingdom .

Primary Examiner—Stephen F. Husar
Attorney, Agent, or Firm—Young & Thompson

[57] ABSTRACT

The starting gas is partly condensed in an exchanger 1. The refrigerating power is supplied, on one hand, by the free expansion of the liquid fraction and, on the other hand, by expansion in a gas-bearing turbine of the vapor fraction rich in hydrogen. A small part of this vapor fraction is used to feed auxiliary gases to the turbine, then is cooled in the exchanger 1, expanded and injected into the expanded liquid fraction so as to obtain a sufficiently low bubble point. The invention is useful in recovering hydrogen from purge gases of apparatus for ammonia synthesis, the purge gases being composed of hydrogen and less volatile components.

5 Claims, 1 Drawing Figure

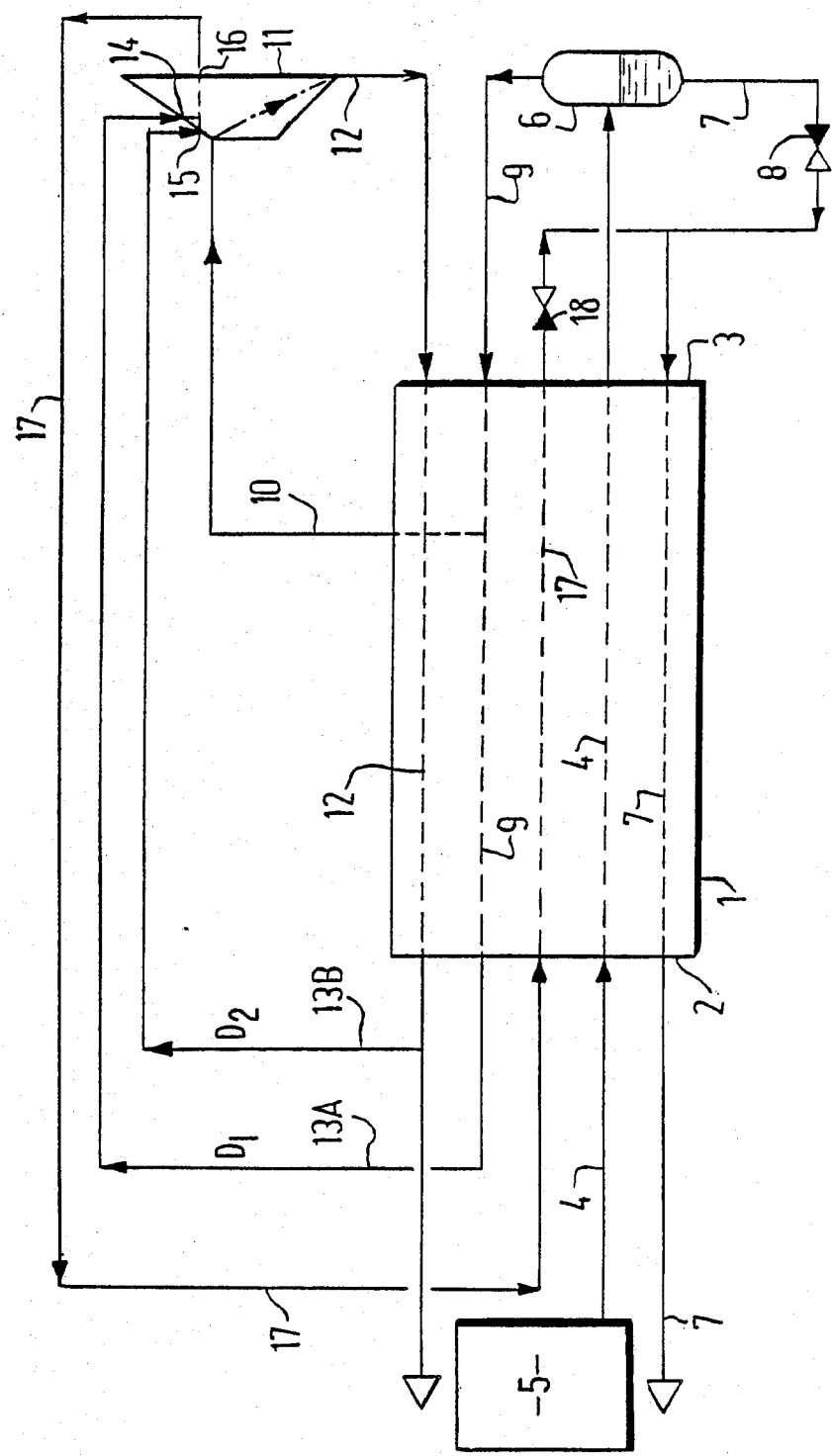

HYDROGEN-CONCENTRATING PROCESS AND APPARATUS

The present invention relates to a process for concentrating hydrogen from a gas containing, in addition to the hydrogen, one or more other less volatile components, of the type comprising cooling the gas to be treated until there are obtained a vapour fraction rich in hydrogen and a liquid fraction; collecting and expanding the liquid fraction, and vaporizing it in heat exchange with said gas; expanding at least a part of the vapour fraction in a gas-bearing turbine, then heating it in heat exchange with said gas; taking off a first output of the vapour fraction, after heating, for feeding auxiliary gases to the turbine; and adding to said expanded liquid fraction a second output of said vapour fraction which is expanded to the same pressure.

It is generally known to concentrate the hydrogen from a mixture in gaseous phase available under pressure, in particular a purge gas of an apparatus for the synthesis of ammonia, by eliminating by partial condensation the components which are distinctly less volatile than the hydrogen, such as $C_2H_6$, $CH_4$, Ar, $O_2$ and $N_2$.

In this technique, by simply expanding the liquid fraction, the liquid fraction, when heated, begins to vaporize at a temperature which is frequently not low enough to attain the desired purity of the hydrogen in the vapour fraction. This is why a small quantity of this vapour fraction is added, after expansion, to the expanded liquid fraction, which lowers the bubble point of the mixture. This is the case when the main components of the vapour phase and the liquid phase have very different volatilities.

Further, particularly in the case of small apparatus, it may be necessary to complement the amount of cold produced by the free expanison and there is employed for this purpose a turbine through which flows all or part of the vapour fraction. There is then a possibility of employing a turbine of the type having gas bearings. Indeed, these turbines permit reaching very high speeds of rotation incompatible with conventional oil-bearing turbines and thus obtaining distinctly higher adiabatic efficiencies, particularly when the gas cooled in the turbine is a very light gas such as hydrogen.

Gas-bearing turbines employ appreciable quantities of auxiliary gases which are divided in the following manner:

- a bearing gas sustains the bearings and acts as an axial thrust bearing for the shaft of the turbine and eliminates any metal-to-metal contact;
- a brake gas maintains a sufficient pressure in the brake-compressor coupled to the turbine; and
- a barrier gas prevents, on one hand, the gas in process of expansion from migrating toward the bearings and cooling them to a mechanically incompatible temperature, and, on the other hand, counterbalances the inevitable cooling of the bearings by thermal conduction.

In order to avoid any pollution of the gas treated with the auxiliary gases, the treated gas itself is used as auxiliary gases. However, the corresponding output from the turbine is at a pressure lower than the exhaust pressure of this turbine, and as this output is too low to justify the use of an additional compressor, it is lost for the main application for which the hydrogen is intended and can only be employed under conditions which are hardly worth while, for example for heating the factory. This is an obstacle to the use of gas-bearing turbines since this loss is added to that resulting from the necessity, explained before, of adding a small supply of the vapour fraction to the expanded liquid fraction.

An object of the present invention is to permit the use, in the aforementioned context, of a gas-bearing turbine with a highly reduced hydrogen loss.

The invention therefor provides a process of the aforementioned type, wherein the auxiliary gases issuing from the turbine are used for forming said second output.

The invention also provides an apparatus for carrying out said process. In this apparatus, which is of the type comprising a heat exchanger; a first conduit which leads from a source of said gas, extends through the exchanger from the warm end to the cold end and then leads to a phase separator; a second conduit which leads from the lower end of said separator, is provided with an expansion valve and extends through the heat exchanger from the cold end to the warm end; a third conduit which leads from the upper end of the separator and extends through the heat exchanger from the cold end to the warm end; a fourth conduit which leads from a point of the third conduit to the intake of a gas-bearing turbine; a fifth conduit which leads from the exhaust of said turbine and extends through the heat exchanger from the cold end to the warm end, said second, third and fifth conduits extending through the heat exchanger in thermal exchange relation to said first conduit; at least one auxiliary conduit which leads from the third or fifth conduit, at the warm end of the heat exchanger, to an auxiliary gas inlet of the turbine; and a seventh conduit for supplying gas rich in hydrogen and leading to a point of said second conduit located between the expansion valve of the second conduit and the cold end of the heat exchanger; said seventh conduit is connected to the auxiliary gas outlet of the turbine.

One manner of carrying out the invention will now be described with reference to the accompanying drawing in which the single FIGURE diagrammatically represents an apparatus for concentrating hydrogen according to the invention.

In the drawing, a rectangle 1 represents a heat exchanger which may be of any suitable type and may be in two respectively "cold" and "warm" parts. This exchanger effects a number of heat transfers in a counter-current manner between a warm end 2 at ambient temperature and a cold end 3.

In the following description, for reasons of simplification, the word "conduit" will be used to designate means for circulating a fluid through the exchanger 1; it will be understood that this term must be interpreted in its broadest sense and may designate a tube, a nest of tubes, or one or more flat passages, or even the radiator of the exchanger.

A first conduit 4, connected to a source 5 of gas to be treated, extends from the warm end 2 to the cold end 3 of the exchanger 1. The source 5 is, in the presently-described embodiment, an apparatus for the synthesis of ammonia, the gas to be treated containing, in addition to hydrogen, distinctly less volatile components such as $C_2H_6$, $CH_4$, Ar, $O_2$ and $N_2$.

In the course of its passage through the exchanger, this gas is cooled and partly condenses. The temperature of the cold end is so chosen that the partial pressure of the components other than hydrogen descends to a predetermined low value. At the outlet of the exchanger, the conduit 4 leads to a phase separator 6.

A second conduit 7 leads from the bottom of the separator 6 and is provided with an expansion valve 8. After this valve, the conduit 7 extends through the exchanger from the cold end to the warm end. Thus the liquid fraction received in the separator is revaporized in a counter-current manner with the treated gas.

A third conduit 9 leads from the top of the separator 6 and extends through the exchanger 1 from the cold end to the warm end. The vapour fraction contained in this conduit is heated in this way and supplies cold to the treated gas. In fact, practically the whole of the vapour fraction contained in the conduit 9 leaves the exchanger at an intermediate point through a fourth conduit 10, is expanded in a gas-bearing turbine 11 and then passes through the whole of the exchanger from the cold end to the warm end through a fifth conduit 12 connected to the exhaust of the turbine. The rate of expansion in the turbine 11 is so chosen that the refrigerating power produced is sufficient for maintaining the cold condition in the apparatus. The gas issuing from the turbine is at a mean pressure higher than the low pressure of the conduit 7.

The low output $D_1$ of the vapour fraction which was not sent to the turbine through the conduit 10 is sent through a first auxiliary conduit 13A from the warm end of the exchanger 1 to the barrier gas inlet 14 of the turbine. Further, a low output $D_2$ is taken from the conduit 12 at the warmend of the exchanger and sent through a second auxiliary conduit 13B to the inlet 15 of the bearing gas and brake gas of the turbine.

After use, all of the auxiliary gases are collected at the auxiliary outlet 16 of turbine 11 and sent through a conduit 17 to the warm end of the exchanger which this conduit extends through from end to end. At the cold end, the conduit 17 is provided with an expansion valve 18 which brings the pressure of the conveyed gas to the low pressure of the apparatus, which is that prevailing in the conduit 7 downstream of the valve 8. The conduit 17 leads to a point of the conduit 7 located between this valve 8 and the cold end of the exchanger.

In this way, all of the auxiliary gases, after there use in the turbine, are recovered, cooled to the same temperature level as the treated gas and reinjected into the expanded liquid fraction so as to lower the bubble point. This is made possible by the observation that, in this type of apparatus, the output of purified gas rich in hydrogen required for the lowering of this bubble point is of the same order as the output $D_1+D_2$ of auxiliary gases needed for the gas-bearing turbine.

Consequently, the loss of purified gas is limited to the output $D_1+D_2$ which passes into the low-pressure residual gas through the conduit 7 after heating up to ambient temperature.

The apparatus described hereinbefore presupposes that certain conditions are fulfilled as concerns the pressure of the auxiliary gases, namely:

the outlet pressure of these gases at point 16 must be higher than the low pressure of the apparatus by a sufficient amount to overcome the pressure drops resulting from their passage through the conduit 17;

the ratio of the inlet pressure of the bearing gas to the outlet pressure of this gas must be sufficient to ensure the support of the shaft of the turbine; this ratio may be for example of the order of 2.5;

the inlet pressure of the barrier gas must be between the inlet pressure and the exhaust pressure of the treated gas so that the barrier function is correctly performed, and the inlet pressure of the brake gas must be of the order of magnitude of the exhaust pressure of the turbine, in the frequent case where this exhaust and the intake of the brake compressor are axial, so as to balance the axial thrust on the shaft of the turbine.

This explains why the barrier gas may only be taken from the high pressure conduit 9, while the brake gas and the bearing gas may be taken from the conduit 12 at medium pressure. It will be understood that, by way of a modification, the brake gas and the bearing gas could also be taken from the conduit 9 and possibly expanded before they enter the turbine.

In the apparatus described hereinbefore, it has been assumed that the sum of the outputs $D_1$ and $D_2$ was exactly equal to the output required to obtain at the cold end of the exchanger the desired bubble point of the revaporized mixture. If $D_1+D_2$ is slightly in excess, this permits the use of a heat exchanger having slightly lower performances and consequently cheaper. If $D_1+D_2$ is slightly insufficient, this output may be complemented by a small output taken from the conduit 12 connected to the exhaust of the turbine.

It will be understood that the invention is also applicable to apparatus in which the thermal exchange line comprises a plurality of exchangers for effecting a plurality of partial condensations of the starting mixture and avoiding any problem of solidification of the less volatile components. In such apparatus, as in that shown in the drawing, the gas rich in hydrogen is added at the cold end of the thermal exchange line.

What is claimed is:

1. A process for concentrating hydrogen from a gas containing, in addition to hydrogen, one or more other less volatile components, comprising cooling the gas to be treated until there are obtained a vapour fraction rich in hydrogen and a liquid fraction; collecting and expanding the liquid fraction and vaporizing it in heat exchange relation to said gas; expanding at least a part of the vapour fraction in a gas-bearing turbine, then heating it in heat exchange relation to said gas; taking off a first output of the vapour fraction, after heating, so as to supply auxiliary gases to the turbine; and adding to said expanded liquid fraction a second output of said vapour fraction, expanded to the same pressure, the auxiliary gases issuing from the turbine being employed for constituting said second output.

2. A process according to claim 1, comprising cooling the auxiliary gases issuing from the turbine before adding them to said expanded liquid fraction.

3. A apparatus for concentrating hydrogen from a gas containing, in addition to hydrogen, one or more other less volatile components, comprising a source of said gas; a heat exchanger having a warm end and a cold end; a phase separator; a first conduit which leads from said source, extends through the exchanger from the warm end to the cold end thereof, and then leads to said phase separator; a second conduit which leads from a lower end of said separator, is provided with an expansion valve and extends through the exchanger from the cold end to the warm end thereof; a third conduit which leads from an upper end of the separator and extends through the exchanger from the cold end to the warm end thereof; a gas-bearing turbine having an intake, an auxiliary gas inlet and an exhaust; a fourth conduit which leads from a point of the third conduit and leads to the intake of the gas-bearing turbine; a fourth conduit which leads from the exhaust of said turbine and extends through the exchanger from the cold end to the warm end thereof, said second, third and fifth conduits extending through the exchanger in thermal exchange relation to said first conduit; at least an auxiliary conduit which leads from one of the third and fifth conduits, at the warm end of the exchanger, to the auxiliary gas inlet of the turbine; and a seventh conduit for supplying gas rich in hydrogen and leading to a point of said second conduit located between the expansion valve of said second conduit and the cold end of the exchanger; said seventh conduit being connected to an auxiliary gas outlet of the turbine.

4. A apparatus according to claim 3, wherein said seventh conduit extends through the exchanger from the warm end to the cold end, between said auxiliary gas outlet and said second conduit.

5. A apparatus according to claim 3, wherein said seventh conduit includes an expansion valve.

* * * * *